(12) United States Patent  (10) Patent No.: US 8,564,614 B2
Muraki et al.  (45) Date of Patent: Oct. 22, 2013

(54) DISPLAY CONTROL APPARATUS, DISPLAY CONTROL METHOD AND RECORDING NON-TRANSITORY MEDIUM

(75) Inventors: Jun Muraki, Hamura (JP); Hiroshi Shimizu, Akishima (JP); Hiroyuki Hoshino, Ome (JP); Erina Ichikawa, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 376 days.

(21) Appl. No.: 12/861,924

(22) Filed: Aug. 24, 2010

(65) Prior Publication Data

US 2011/0050722 A1   Mar. 3, 2011

(30) Foreign Application Priority Data

Aug. 27, 2009   (JP) ................................ 2009-196554

(51) Int. Cl.
  *G09G 5/00*   (2006.01)
(52) U.S. Cl.
  USPC ............................ 345/619; 345/620; 345/629
(58) Field of Classification Search
  None
  See application file for complete search history.

(56) References Cited

U.S. PATENT DOCUMENTS

| 2007/0014554 | A1* | 1/2007 | Sasaki et al. ..................... 396/55 |
| 2007/0242140 | A1 | 10/2007 | Kimura |
| 2008/0022230 | A1* | 1/2008 | Ogawa et al. ................. 715/838 |
| 2008/0088747 | A1* | 4/2008 | Kita et al. ..................... 348/715 |
| 2008/0297437 | A1* | 12/2008 | Takahashi ......................... 345/8 |
| 2009/0232416 | A1* | 9/2009 | Murashita et al. ............. 382/294 |
| 2009/0296117 | A1* | 12/2009 | Wada et al. ..................... 358/1.9 |
| 2010/0225971 | A1* | 9/2010 | Yokose ........................ 358/1.18 |

FOREIGN PATENT DOCUMENTS

| CN | 101056354 A | 10/2007 |
| JP | 11-331693 A | 11/1999 |
| JP | 2001-274970 A | 10/2001 |
| JP | 2003-060966 A | 2/2003 |
| JP | 2006157431 A | * 11/2004 |
| JP | 2006-157431 A | 6/2006 |
| JP | 2006-174188 A | 6/2006 |

OTHER PUBLICATIONS

Japanese Office Action dated Sep. 13, 2011 (and English translation thereof) in counterpart Japanese Application No. 2009-196554.
Japanese Office Action dated Jul. 31, 2012 and English translation thereof in counterpart Japanese Application No. 2009-196554.
Chinese Office Action dated Jun. 4, 2012 (and English translation thereof) in counterpart Chinese Application No. 201010267952.1.

* cited by examiner

*Primary Examiner* — Daniel Hajnik
*Assistant Examiner* — Naveed Hasan
(74) *Attorney, Agent, or Firm* — Holtz, Holtz, Goodman & Chick, PC

(57) ABSTRACT

A display control apparatus controls an input unit that inputs pieces of captured image data, an acquisition control unit that controls consecutive acquisition of a plurality of pieces of image data, a memory control unit that buffers in the memory unit the plurality of pieces of image data consecutively acquired by the acquisition control unit, an image compositor that composites the latest buffered image data and other (non-latest) pieces of image data successively buffered in the memory control unit, and a display control unit that displays chronologically an image represented by a image data composited by the image compositor.

7 Claims, 13 Drawing Sheets

DISPLAY CONTROL APPARATUS, DISPLAY CONTROL METHOD AND RECORDING NON-TRANSITORY MEDIUM

CROSS-REFERENCE TO RELATED APPLICATION

This application claims the benefit of Japanese Patent Application No. 2009-196554 filed Aug. 27, 2009, the entire disclosure of which is incorporated by reference herein.

FIELD

The present application relates to an apparatus and method for controlling a display, and a recording non-transitory medium.

BACKGROUND

Traditionally, cameras record the image captured at the moment of operation of the shutter key (or thereafter).

However, it is not possible to record an image captured prior to the operation of the shutter key.

Hence, a solution to this issue has been devised.

For example, Unexamined Japanese Patent Application KOKAI Publication No. 2006-174188 discloses the following technique:

Prior to detection of the operation of the shutter key, cyclically storing pieces of captured image data in a buffer region and displaying them on a display device. If operation of the shutter key is detected whilst an image is being displayed, that image being displayed at the time of detection is then stored as a file on the recording medium.

However, because it is described in Unexamined Japanese Patent Application KOKAI Publication No. 2006-174188 that the currently-captured image is also displayed on the display device in the same way as conventional methods, operators are unable to determine whether the image displayed is an image which has been cyclically stored in the memory, or instead a recently-captured image data.

SUMMARY

The application provides a technique in which a displayed image can be distinguished in a simple manner as either an image which has been cycled through the memory, or a recently-captured image.

According to a first aspect of the present application, a display control apparatus may include:

an input unit that inputs a piece of image data an acquisition control unit that controls the input unit to consecutively acquire a plurality of pieces of image data;

a memory control unit that successively stores in a memory unit the plurality of pieces of image data consecutively acquired by the acquisition control unit;

a first image compositor that composites a latest stored image data from among the plurality of pieces of image data stored by the memory control unit, and other of the plurality of pieces of image data and a display control unit that causes a display unit to display an image based on a composited image data composited by the first image compositor.

According to a second aspect of the present application, a display control method preferably includes the steps of:

controlling an image data input unit to consecutively acquire a plurality of pieces of image data;

successively storing in a memory unit the plurality of pieces of image data consecutively acquired by the step of image data acquisition control;

compositing a latest stored image data from among the plurality of pieces of image data stored by the memory control unit, and other of the plurality of pieces of image data and causing a display unit to display an image based on a composited image data composited in the step of image data compositing.

According to a third aspect of the present application, a recording non-transitory medium preferably stores a program to serve as the following on a computer:

an input unit that inputs a piece of image data an acquisition control unit that controls the input unit to consecutively acquire pieces of image data;

a memory control unit that successively stores in a memory unit the plurality of pieces of image data consecutively acquired by the acquisition control unit;

an image compositor that composites a latest stored image data from among the plurality of pieces of image data stored by the memory control unit, and other of the plurality of pieces of image data and a display control unit that causes a display unit to display an image based on a composited image data composited by the first image compositor.

BRIEF DESCRIPTION OF THE DRAWINGS

A more complete understanding of this application can be obtained when the following detailed description is considered in conjunction with the following drawings, in which.

DETAILED DESCRIPTION

The embodiments of the present application are described with reference to the drawings.

However, the present application is not limited to the following embodiments and drawings.

Embodiment 1

Embodiment 1 is described in the following.

The display control apparatus of the present embodiment is an image capturing apparatus such as digital cameras.

In addition to general still-image capturing mode and movie capturing mode, the display control apparatus of the present application also includes the following image recording mode.

Figure 1:
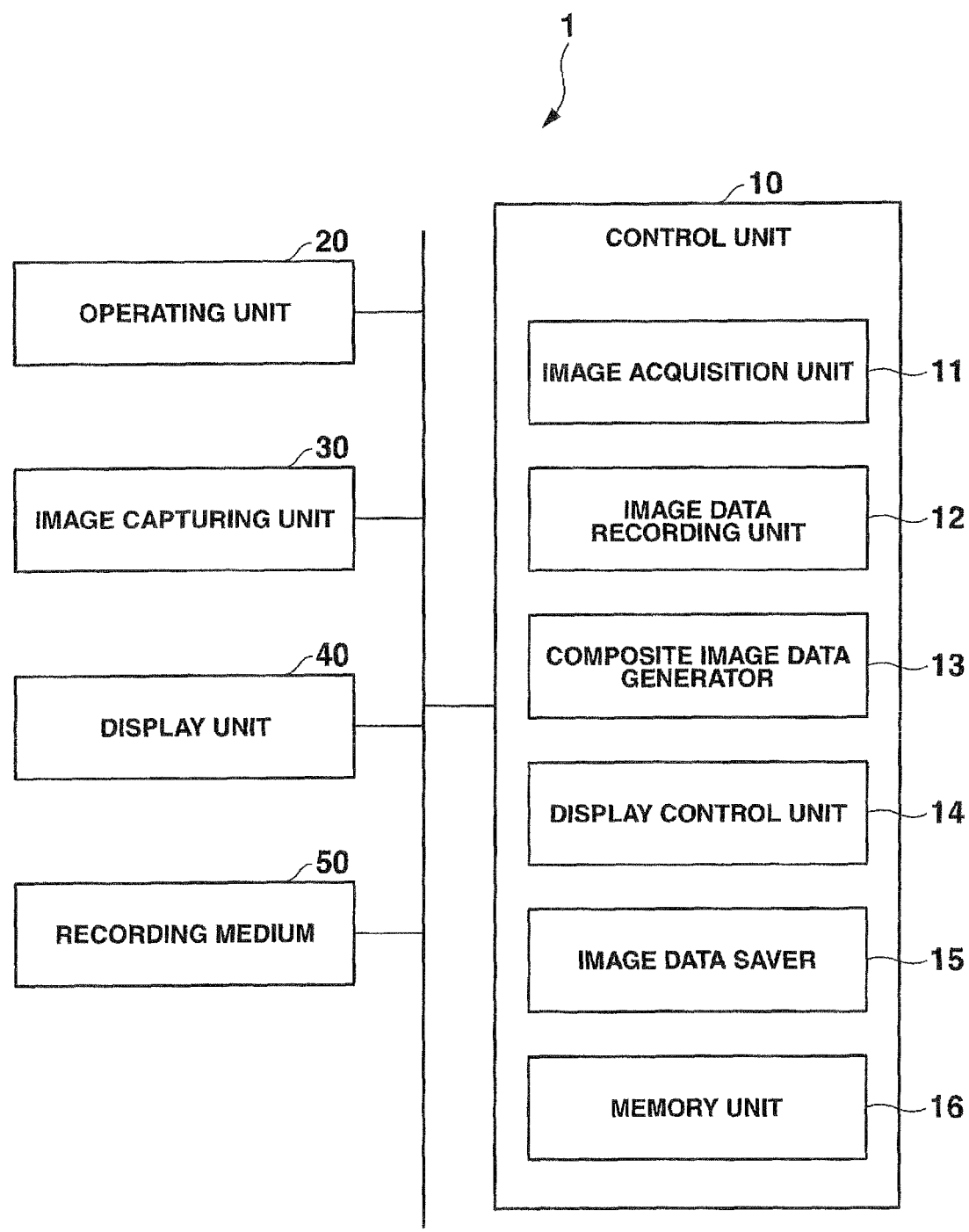
FIG. 1 is a block diagram illustrating an exemplary structure for the display control apparatus according to embodiment 1.

Under the image recording mode, when selection and operation of this mode is detected, pieces of image data are consecutively captured at the predetermined shutter speed and buffered in succession; when pressing of the shutter key is detected, the specified number of the pieces of buffered image data are saved The function and structure of display control apparatus 1 are described using FIG. 1.

The display control apparatus 1 comprises a control unit 10, operating unit 20, image capturing unit 30 and display unit 40.

The control unit 10 controls the entire display control apparatus 1. The control unit 10 comprises an image data acquisition unit 11, an image data recording unit 12, a composite image data generator 13, a display control unit 14, an image data saver 15 and a memory unit 16.

When the image data recording mode is selected by operation from the operator, and the control unit 10 receives an operation input signal from the operating unit 20, the control unit 10 performs the first display control process described below.

The operating unit 20 receives an operation input from the operator, an operation input signal in accordance with which is provided by the operating unit 20 to the control unit 10.

Triggered by, for example, detection of the operator's instruction to take a image, the image capturing unit 30 inputs the image formed on the sensor, as an imaging signal, and provides it to the control unit 10.

The display unit 40 displays the menu screen and the settings screen needed to operate the display control apparatus 1, images represented by captured image data and composite image data as described below.

The recording medium 50 is mounted on the display control apparatus 1.

Image data, including still-image data and movie data are saved in recording medium 50.

However, the memory unit 16 in the display control apparatus 1 may serve the same function as the recording medium 50.

(In this case, a part of the memory unit 16 in the display control apparatus 1 serves as the memory region of the recording medium 50.)

The recording medium 50 is composed of, for example, memory cards comprising semiconductor devices, such as a flash memory.

Figure 2:
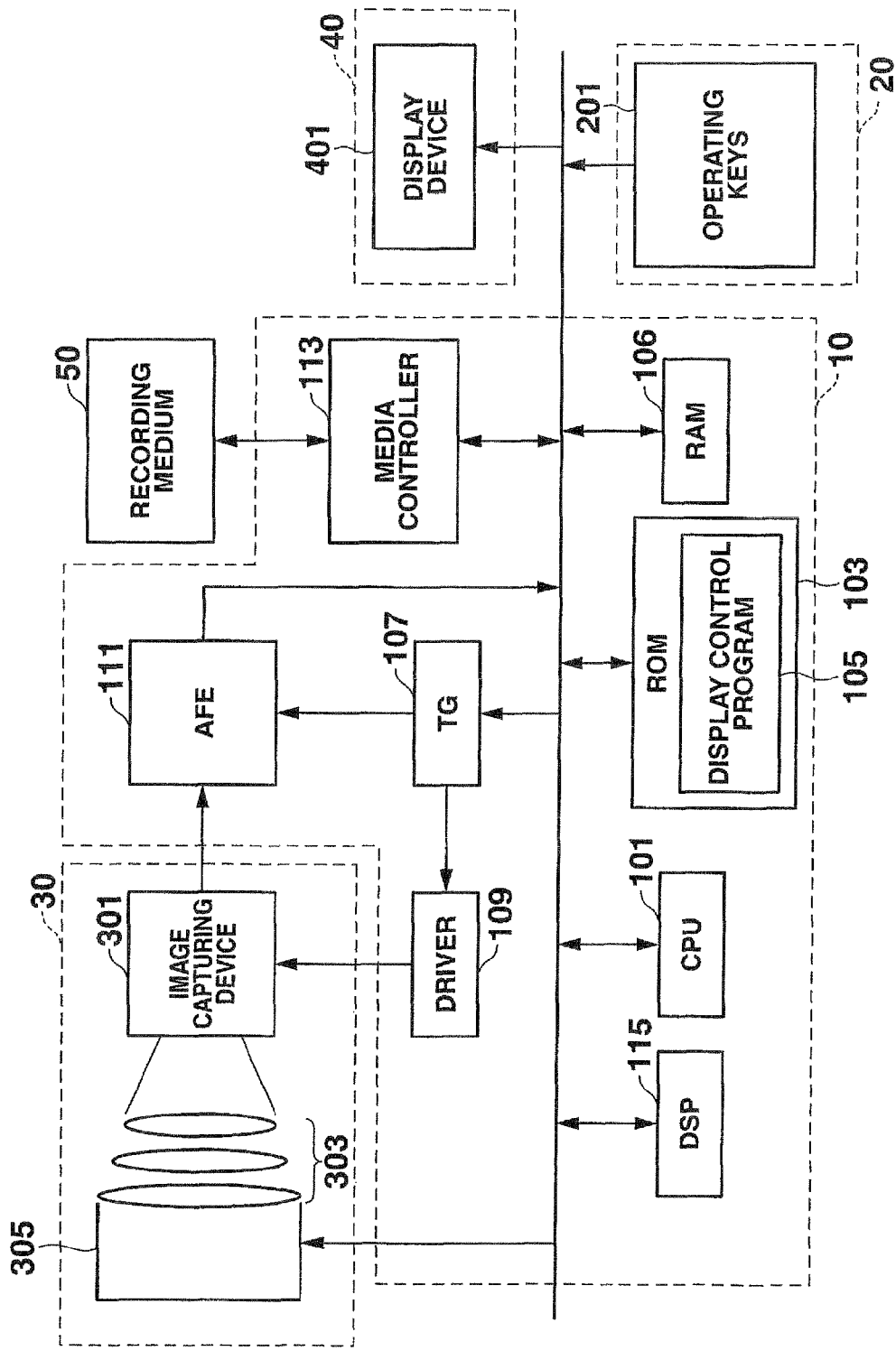
FIG. 2 is a block diagram illustrating an exemplary structure for the display control apparatus hardware according to embodiment 1.

Next, the hardware structure of the display control apparatus 1 in the embodiment is described using FIG. 2.

The display control apparatus 1 comprises a CPU (Central Processing Unit) 101, ROM (Read Only Memory) 103, display control program 105, RAM (Random Access Memory) 106, a TG (Timing Generator) 107, a driver 109, an AFE (Analog Front End) 111, a media controller 113, a DSP (Digital Signal Processor) 115, operating keys 201, an image capturing device 301, lenses 303, an actuator 305 and a display devise 401.

However, each component comprised by the display control apparatus 1 may be synchronized as needed by the TG 107 or by another timing generator, not illustrated.

The control unit 10 in FIG. 1 comprises a CPU 101, ROM 103, a display control program 105, RAM 106, a TG 107, a driver 109, an AFE 111, a media controller 113 and a DSP 115.

In particular, the image data acquisition unit 11, the image data recording unit 12, the composite image data generator 13, the display control unit 14, and the image data saver 15 are configured by applicable combinations of the CPU 101, the TG 107, the driver 109, the AFE 111, the media controller 113, the DSP 115 and so on. to perform the process according to the display control program 105.

The memory unit 16 comprises ROM 103 RAM 106 and so on.

The CPU 101 controls the operation of each component of the display control apparatus 1: the CPU 101 generates data to control each component, and provides the control data to the components, controlling them thereby.

In particular, according to the operation input signal from the operating unit 20 and the display control program 105 recorded in the ROM 103, the CPU 101 uses various data recorded in the ROM 103 to control the components and carry out the first display control process described below.

The data provided by the CPU 101 is, for example, provided via the RAM 106.

The CPU 101 also provides data to each component via, for example, the RAM 106.

The ROM 103 is composed of suitable semiconductor memory devices.

The ROM 103 stores the various programs comprising the display control program 105 and various data used by the CPU 101.

These programs and data are either retrieved directly by the CPU 101, or otherwise stored temporarily in the RAM 106.

The ROM 103 may alternatively be substituted by other rewritable auxiliary memory devices.

The RAM 106 is composed of suitable semiconductor memory devices.

The RAM 106, functions both as the working memory of the CPU 101, and as temporary storage for the various data described below.

The display control program 105 may operate together with an OS (Operation System) to cause the CPU 101 to carry out the first display control process described below.

The display control program 105 may alternatively be stored on a removable recording non-transitory medium (CD-ROM (Compact Disk Read Only Memory), DVD-ROM (Digital Versatile Disk Read Only Memory) and so on.) from which it is supplied to the display control apparatus 1.

The display control program 105 may alternatively be supplied to the display control apparatus 1 via the network.

The ROM 103, RAM 106 or removable recording non-transitory medium in which the display control program 105 is stored constitutes a computer-readable program product.

The TG 107 generates a pulse signal to cause the driver 109 to operate, and supplies the signal to the driver 109.

The interval between imaging signals for each one frame (one piece of image data) supplied by the image capturing device 301 described below depends on the pulse signal supplied by the TG 107 to the driver 109.

The TG 107 supplies the same pulse signal to the AFE 111.

The supply of the pulse signal by the TG 107 synchronizes the activation of the AFE 111 and driver 109.

The driver 109 is an actuation circuit which supplies an actuation signal to the image capturing device 301 described below in response to the pulse signal from the TG 107.

By performing predetermined process to the imaging signal from the image capturing device 301, the AFE 111 generates and outputs the digital data represents the image captured by the image capturing device 301 (hereafter referred to as "image data").

AFE 111 comprises, for example, an OB (Optical Black) clamp unit, a CDS (Correlated Double Sampling) circuit, an AGC (Automatic Gain Control) circuit, and an A/D (Analog/digital) converter (Not illustrated).

The OB clamp unit receives the imaging signal supplied from the image capturing device 301, performs the clamp process, and supplies the resulting post-clamp signal to the CDS circuit.

Receiving a post-clamp signal from the OB clamp unit, the CDS circuit performs a Correlated Double Sampling on the signal and supplies the resulting post-CDS signal to the AGC circuit.

Receiving the post-CDS signal from the CDS circuit, the AGC circuit performs Automatic Gain Control on the signal and supplies the resulting post-AGC signal to the A/D converter.

The gain of the AGC circuit can be controlled by the CPU 101.

The A/D converter converts the analog post-AGC signal supplied from the AGC circuit into a digital signal and supplies the resulting post-conversion digital signal to the DSP 115 as the image data.

The DSP 115 receives the image data from the AFE 111 and performs various processes, the image data conversion to YUV (brightness/contrast) data and processes to improve image data quality as needed. Thereafter, the DSP 115 stores the processed image data in the RAM 106.

The CPU 101 may also, where appropriate, perform various processes on the image data stored in the RAM 106 to generate new image data with modified image size and resolution and storing the new image data in the RAM 106.

The CPU 101 may also, where appropriate, perform compression processes on the image data stored in the RAM 106 and re-record this processed data to the RAM 106.

In still-image capturing modes, the CPU 101 performs data compression in JPEG format or similar formats on YUV data stored in the RAM 106 and stores the resulting new image data in the RAM 106.

In movie capturing modes, the CPU 101 performs data compression in MPEG format or similar formats on YUV data stored in the RAM 106 and stores the resulting new image data in the RAM 106.

The CPU 101 also, where appropriate, converts the YUV data stored in the RAM 106 into compressed or uncompressed RGB data and stores the resulting new RGB image data in the RAM 106.

The media controller 113 receives from the RAM 106 the image data which is compressed depending on the capturing mode, and controls the saving of the image data to the recording medium 50.

Hence, in still-image capturing modes, the media controller 113 receives a still image from the RAM 106, and controls the saving of the image to the recording medium 50.

In movie capturing modes, the media controller 113 receives movie data constituted by multiple pieces of still image data from the RAM 106, and controls to save the movie data to the recording medium 50.

The operating unit 20 in FIG. 1 comprises operating keys 201.

The operating keys 201 include multiple operating keys such as a shutter key which may be operated with either a half-press or full-press action, in addition to mode switching keys, a directional keypad, zoom key, menu key, set key and power key.

In the image recording mode, the operating keys 201 are used to start and end image recording.

Hence, the CPU 101 begins recording of pieces of image data when the operator uses the operating keys 201 to select and operate a mode.

Furthermore, when the operator uses the operating keys 201 to command the CPU 101 to store pieces of buffered image data, the CPU 101 stores the buffered image data as a file at that time.

The image capturing unit 30 in FIG. 1 comprises an image capturing device 301, lenses 303 and actuator 305.

The lenses 303 comprise lenses such as a focus lens and a zoom lens.

The multiple lenses are actuated by the lens actuator contained within the actuator 305.

The lens actuator comprises motors to move lenses 303 along the lens axis, and a motor driver to actuate the motors.

The lens actuator actuates the motors via the motor driver to move the lenses 303 along the lens axis.

The actuator 305 comprises an aperture/shutter unit.

The aperture/shutter unit includes an aperture/shutter and actuation circuit.

The actuation circuit actuates the aperture/shutter.

The aperture/shutter composites an aperture and a shutter.

The aperture refers to a mechanism for controlling the amount of light that enters via the lenses 303. The shutter refers to a mechanism for controlling the length of time during which the image capturing device 301 is irradiated, i.e. the time for which the light-receiving element receives light.

The image capturing device 301 may comprise, for example, one of various CCD (Charge Coupled Device) image sensors with a Bayer arrangement of color filters.

In accordance with the actuation signal from the driver 109, the image capturing device 301 captures the image from light entering through the lenses 303, converting photo-electricity in each pixel. The image capturing device 301 amplifies the charge generated by photo-electric conversion for each pixel via an amplifier, and supplies the amplified signal to the AFE 111 as an imaging signal.

The display unit 40 comprises a display devise 401.

The display devise 401 comprises a display screen and display controller.

The display controller is supplied image data stored in the RAM 106.

The display controller displays an image represented by the image data supplied.

Figure 4:
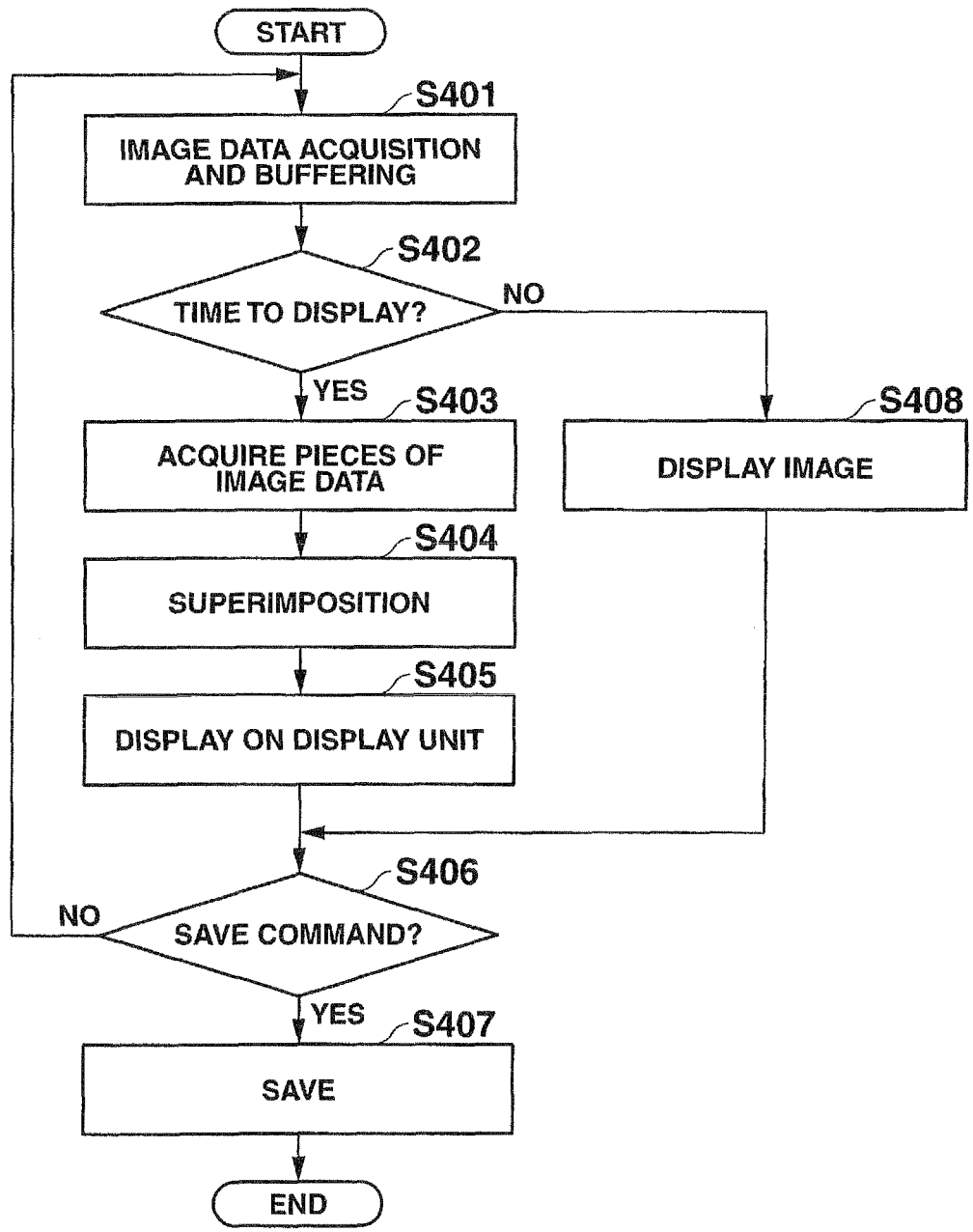
FIG. 4 is a flow chart showing an example of the first display control process performed by the display control apparatus according to embodiment 1.

Next, the first display control process when capturing an image in the image recording mode is described with reference to FIG. 4.

After power-on, the operator carries out the operation to select the image recording mode of the present application from menu screens displayed on the display unit 40 using the operating unit 20.

The operating unit 20 supplies the operation input signal to the control unit 10 in response to the input to select and operate the image recording mode.

The control unit 10 performs the first display control process by receiving the operation input signal from the operating unit 20.

The image data acquisition unit 11 and image data recording unit 12 (the CPU 101, TG 107, driver 109, AFE 111 and DSP 115) acquires and buffers the image data (step S401).

Specifically, the image data acquisition unit 11 controls the actuation of the image capturing unit 30 according to a predetermined shutter speed, and acquires image data for one frame in response to an imaging signal supplied from the image capturing unit 30.

The image data recording unit 12 buffers the acquired image data as the most current (the latest) image data in the specified memory region of the memory unit 16 (RAM 106).

The image data acquisition unit 11 acquires pieces of image data consecutively in step S401 via a repeat of steps S401-S406: No.

The image data recording unit 12 retains the buffered image data as buffered.

The image data recording unit 12 buffers a predetermined number of pieces of image data in the memory unit 16. Before buffering another piece of image data in the memory unit 16 stores the predetermined number of the pieces of image data, the image data recording unit 12 deletes the earliest buffered image data in the memory unit 16.

Figure 3:
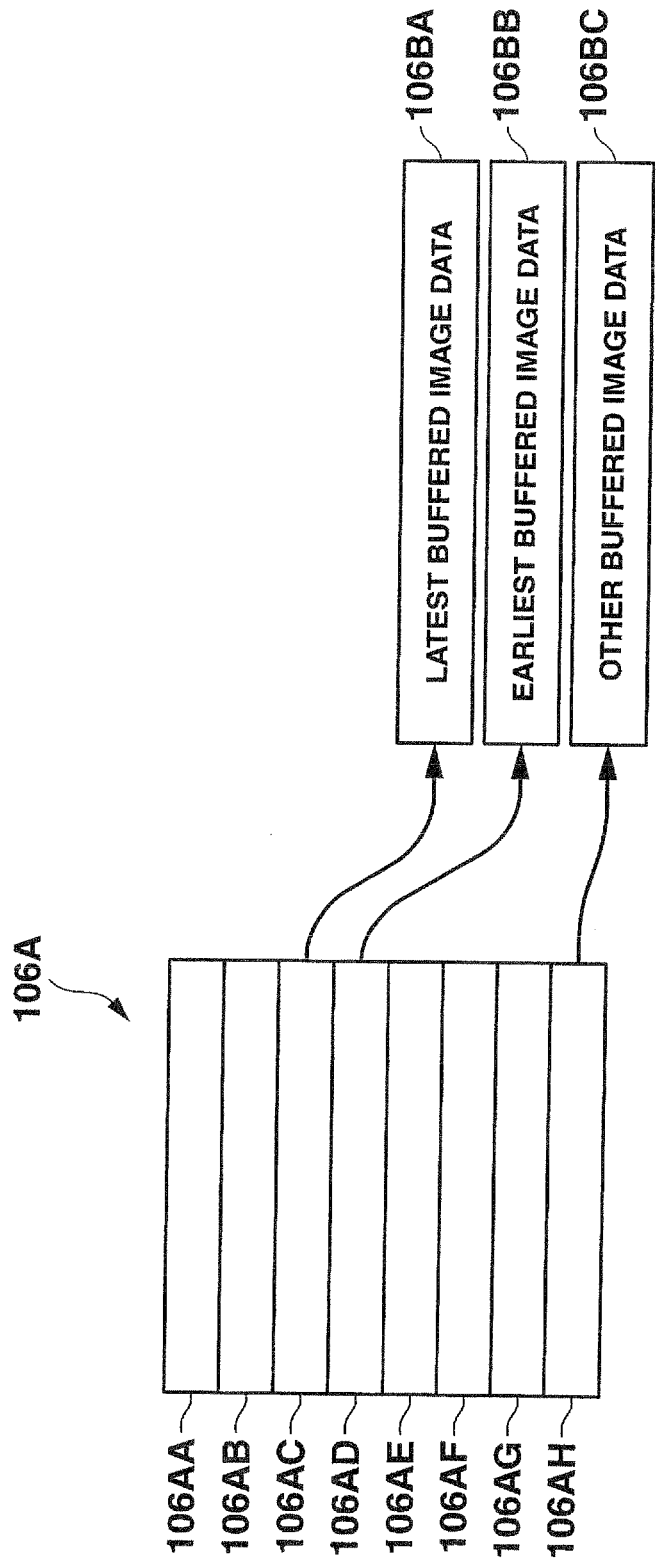
FIG. 3 is a diagram illustrating an example of a memory region in a memory unit of a display control apparatus according to embodiment 1.

Specifically, as illustrated in FIG. 3, in the process of the initial step S401, image data is first buffered in memory region 106AA of the memory unit 16.

Thereafter, for each repeat of the process in step S401, image data is buffered in subsequent memory region 106AB, 106AC . . . 106AH. Thereafter, newly-acquired pieces of image data are buffered successively by overwriting data in memory regions 106AA, 106AB, constituting a cyclic buffering of pieces of image data.

Next, the image data acquisition unit 11 (the CPU 101) determines whether or not it is a timing to display the buffered image data (step S402).

Specifically, the image data acquisition unit 11 performs step S402 by determining whether the number of pieces of image data buffered in the memory unit 16 by the image data recording unit 12 exceeds the specified value.

For example, if pieces of image data are buffered in all the memory regions 106AA-106AH, it is determined to be the timing to display.

Where the image data acquisition unit 11 determines it to be not time to display the pieces of buffered image data (step S402: No) (Specifically, where pieces of image data are not buffered in all the memory regions 106AA-106AH), the display control unit 14 (the CPU 101) provides the most recent buffered image data in the specified memory region of the memory unit 16 to the display unit 40 (display devise 401) and cause display unit 40 to display the most recent image (step S408).

Thus, until the number of pieces of image data buffered in the memory unit 16 reaches the specified value (more specifically, until pieces of image data to be buffered are stored in all the memory regions 106AA to 106AH), the control unit 10 displays the most recent buffered image data.

However, where the image data acquisition unit 11 determines it to be time to display the buffered image data (step S402: Yes), it acquires pieces of image data for generating the composite image data.

In this case, the image data acquisition unit 11 acquires the image data buffered most recently (or having been buffered for the shortest period) in the memory unit 16 (hereafter referred to as the "latest buffered image data"), the image data buffered earliest (or having been buffered for the longest period) in the memory unit 16 (hereafter referred to as the "earliest buffered image data"), and data from multiple pieces of image data (hereafter referred to as "other of the plurality of pieces of buffered image data") positioned in time between the latest buffered image data and earliest buffered image data (step S403).

There are 8 buffer regions in the memory region 106A as shown in FIG. 3; where there are two of the pieces of buffered image data (where pieces of image data are buffered in memory regions 106AA and 106AH in FIG. 3), either may be selected arbitrarily.

Furthermore, where there are the multiple pieces of buffered image data, including a piece of image data or pieces of image data positioned in time between the latest buffered image data and earliest buffered image data, the image data immediately before the latest buffered image data may, for example, be selected instead.

In this case, the image data acquisition unit 11 stores these pieces of image data, for example, in the operating memory region of the memory unit 16 (for example the working area in the RAM 106 used by the operation of the CPU 101).

The image data acquisition unit 11 also converts the data format of pieces of image data into a data format (for example bitmap format) to generate a first composite image data as described below, and stores the post-conversion data in the operating memory region of the memory unit 16.

Composite image data generator 13 (the CPU 101) composites, by superimposition of at least a part of the image region in an image represented by another piece of buffered image data and an image represented by the latest buffered image data acquired by the image data acquisition unit 11 and stored in the memory unit 16 to generate the first composite image data (step S404).

Where there are multiple pieces of buffered image data, latest buffered image data is used together with one of the pieces of buffered image data to generate a composite image data thereafter the generated composite image data is composited repeatedly with another piece of buffered image data to generate a new composite image data.

The composite image data generator 13 compares the earliest buffered image data with the other piece of buffered image data (or the earliest buffered image data with the latest buffered image data).

The composite image data generator 13 also compares the other piece of buffered image data with the latest buffered image data The composite image data generator 13 then detects motion vectors from the pieces of compared image data for each region partitioned to the specified size.

By detecting regions where the motion vectors are greater than or equal to a predetermined threshold (stored in the memory unit 16), the composite image data generator 13 determines whether the position of a subject image in the region of the two pieces of image data changes beyond a predetermined amount.

Whilst not specifically described, the detection method may employ a commonly known detection method such as Sum of Absolute Differences (SAD) or Sum of Squared Differences (SSD).

Next, the composite image data generator 13 clips out the image regions containing the subject image from both an image represented by the earliest buffered image data and an image represented by the other piece of buffered image data.

Specifically, the composite image data generator 13 clips out the image regions where motion vectors are greater than or equal to the predetermined threshold from both the image of earliest buffered image data and the image of the other piece of buffered image data.

That image region is represented by data containing position information specifying the position and the area of that image region in the overall image region represented by image data and pixel content information representing contents showed on the area specified by the position information with pixel values.

The composite image data generator 13 replaces image regions in the image represented by latest buffered image data corresponding to those image reasons (regions each represented by the earliest buffered image data and the other piece of buffered image data where motion vectors greater than or equal to the predetermined threshold) by the clipped subject image regions and generate the first composite image data represents the first composite image.

Other than the replacement, generation of the first composite image data may be"image composition by combining by pixel-wise blending of pixel values".

The blending may assign a large blend ratio to the latest buffered image data with other pieces of buffered image data (including the earliest) set to have progressively smaller blend ratios.

Combining the pieces of image data in this way, the first composite image data is generated by composition of the regions represented by pieces of buffered image data to be progressively more transparent as the image region containing the subject image becomes older (longer buffered). Thus, a first composite image data can be generated which represents the passage of time.

Figure 5A:
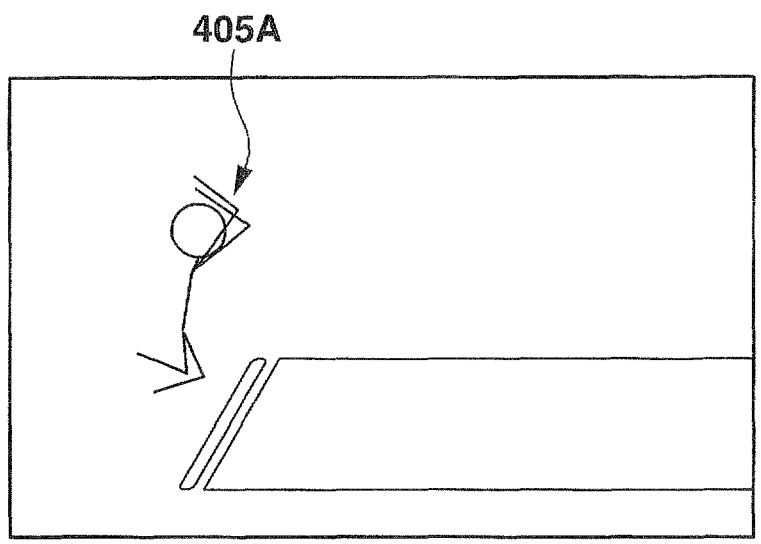
FIG. 5A is a diagram illustrating an example of an image represented by data for the earliest buffered image data buffered in the memory unit of the display control apparatus according to embodiment 1.
Figure 5B:
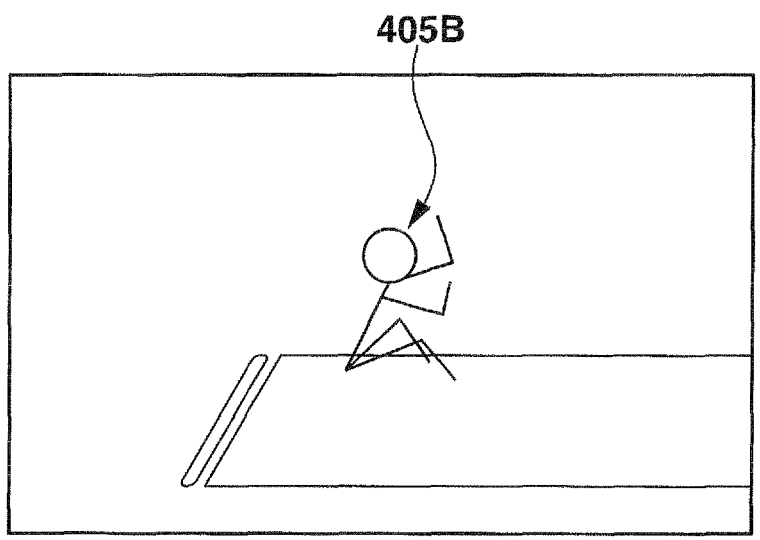
FIG. 5B is a diagram illustrating an example of an image represented by a buffered image data positioned between the earliest buffered image data and the latest buffered image data buffered in the memory unit of the display control apparatus according to embodiment 1.
Figure 5C:
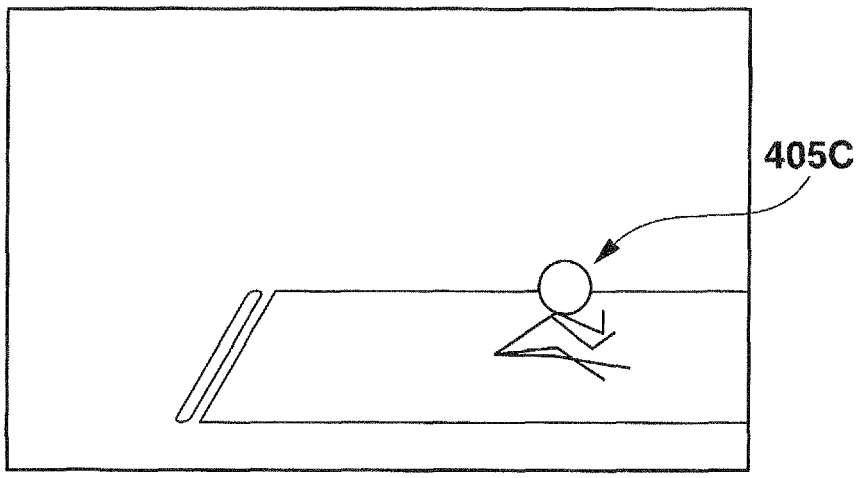
FIG. 5C is a diagram illustrating an example of an image represented by the latest buffered image data buffered in the memory unit of the display control apparatus according to embodiment 1.

According to methods described above, the composite image data generator 13 composites by superimposition of the subject image region 405A on the image represented by the earliest buffered image data in FIG. 5A with the image represented by the latest buffered image data in FIG. 5C to generate a composite image data.

Figure 6:
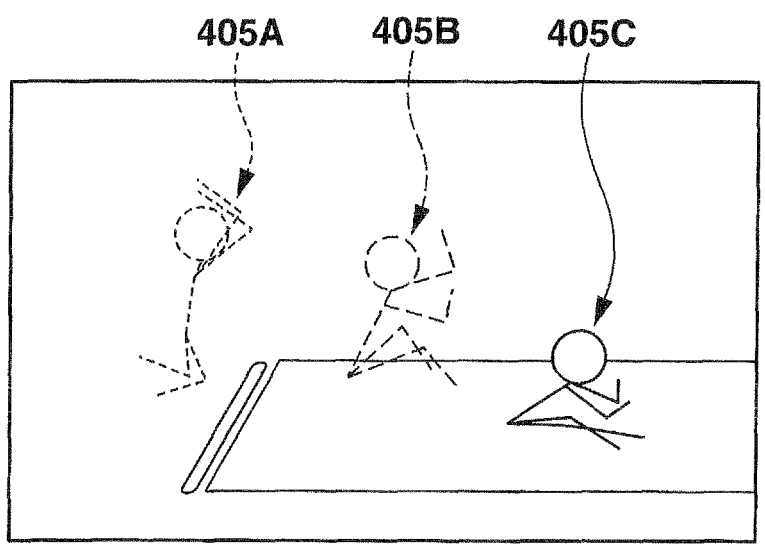
FIG. 6 is a diagram illustrating an example of an image represented by a composite image data generated by the composite image data generator of the display control apparatus according to embodiment 1.

In addition, according to methods described above, the composite image data generator 13 composites by superimposition of the subject image region 405B of the buffered image data in FIG. 5B on the image represented by the composite image data generated by using of the latest buffered image data in FIG. 5C and the earliest buffered image data in FIG. 5A (FIG. 6). The above composition process is referred to as the first process.

In this way, the composite image data generator 13 generates the first composite image data By the same method as that described above, the composite image data generator 13 may composite by superimposition of the entire region of the other pieces of buffered image data on the latest buffered image data to generate the first composite image data. Such a composition process is referred to as the second process.

The first process is suitable for the case of consecutive capturing with the view angle fixed.

Figure 10:
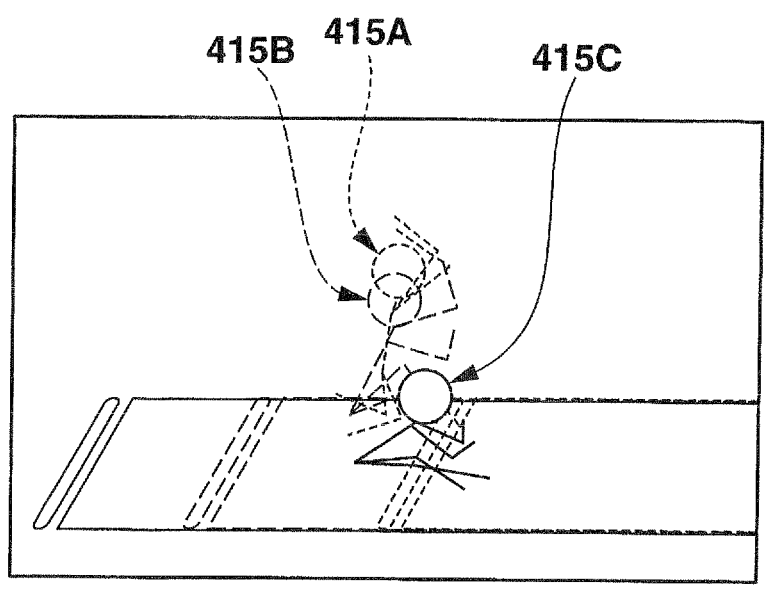
FIG. 10 is a diagram illustrating an example of an image represented by a first composite image data generated by the composite image data generator of the display control apparatus according to embodiment 2.

In contrast, the second process is suitable for the case of consecutive capturing with the view angle moved to place the subject image region at its approximate center (FIG. 10).

The composite image data generator 13 may detect whether, during consecutive capturing, the view angle is fixed or in motion, and select either the first or second process.

In addition, the composite image data generator 13 may determine from the composition process the extent to which the subject image regions overlap, and based on the determination, control the transparency of the subject image region of the earliest buffered image and/or other piece/pieces of buffered image data.

Furthermore, the composite image data generator 13 may determine the degree of movement of the view angle, and based on the determination, control the transparency of the subject image region of the earliest buffered image data and/or other piece/pieces of buffered image data.

Hence the composite image data generator 13 generates a first composite image data and thereafter temporarily stores the first composite image data in the memory unit 16 (RAM 106).

Thereafter, the display control unit 14 displays the image represented by the first composite image data on the display unit 40 (display devise 401) (step S405).

FIG. 6 shows an example of the display by the display control unit 14 in the case.

The image of first composite image data is displayed on the screen of the display unit 40 whilst chronologically adding subject image regions 405A-405C to the image of the latest buffered image data by the composition process.

As a result, the operator can determine in a straightforward manner the state of the earliest buffered image data and/or other piece of/pieces of buffered image data, and additionally, it is made easier to determine at which stage of the composition process the first composite image data is stored as an image file.

In this case, the image data saver 15 (the CPU 101 and media controller 113) detects whether or not there is a save command received for the first composite image data (step S406).

Where displayed as described above, the operator decides to save, the operator operates (for example by pressing down) the operating unit 20 (shutter key).

The operating unit 20 supplies the operation input signal to the image data saver 15.

If this signal is supplied in the step S406 process stage, the image data saver 15 determines there to have been a save command received (step 406: Yes).

In contrast, where the operating unit 20 is not operated, the operation input signal is not supplied; hence the image data saver 15 determines there to have been no save command received (steps 406: No).

Where the image data saver 15 determines there to have been no save command received, the image data recording unit 12 performs the process of step S401.

Thereafter, where the image data saver 15 determines there to have been a save command received (step S406: Yes), the image data saver 15 generates image files in JPEG format for all pieces of captured image data temporarily stored in the memory unit 16 and saves the files to the recording medium 50 (step S407).

In addition to that described above, the image data saver 15 may, in the process of step S407, generate an image file for the first composite image data represents the image displayed by the display unit 40 (step S405) and save it to the recording medium 50.

This ends the description of the process.

Thereafter, the image data saver 15 displays a screen on the display unit 40 indicating that the process has ended.

Thereafter, in response to operation of the operating unit 20 by the operator, the image data saver 15 displays on the display unit 40 an overview of images represented by the pieces of image data saved in the recording medium 50.

Thereafter, in response to operation of the operating unit 20 by the operator, where anyone (or several) of the pieces of image data is selected, the image data saver 15 deletes the unselected pieces of image data from the recording medium 50.

It is apparent that the number of pieces of image data stored in the memory unit 16 can be varied as appropriate.

The image data saved by the image data saver 15 in step S407 may be data of the subject image region (or data of another image region).

Hence, display control apparatus 1 of the embodiment displays on the display unit 40 an image represented by a first composite image data from the composition of at least some of images represented by the consecutively pieces of captured image data.

Hence, the specified number of images represented by pieces of buffered image data can be superposed and displayed on the display unit 40, such that the operator does not need to change the display when capturing an image, and can check images represented by pieces of buffered image data in a straightforward manner.

Embodiment 2

The display control apparatus 2 of embodiment 2 generates composite image data of different types according to the operator's conditions in capturing.

Figure 7:
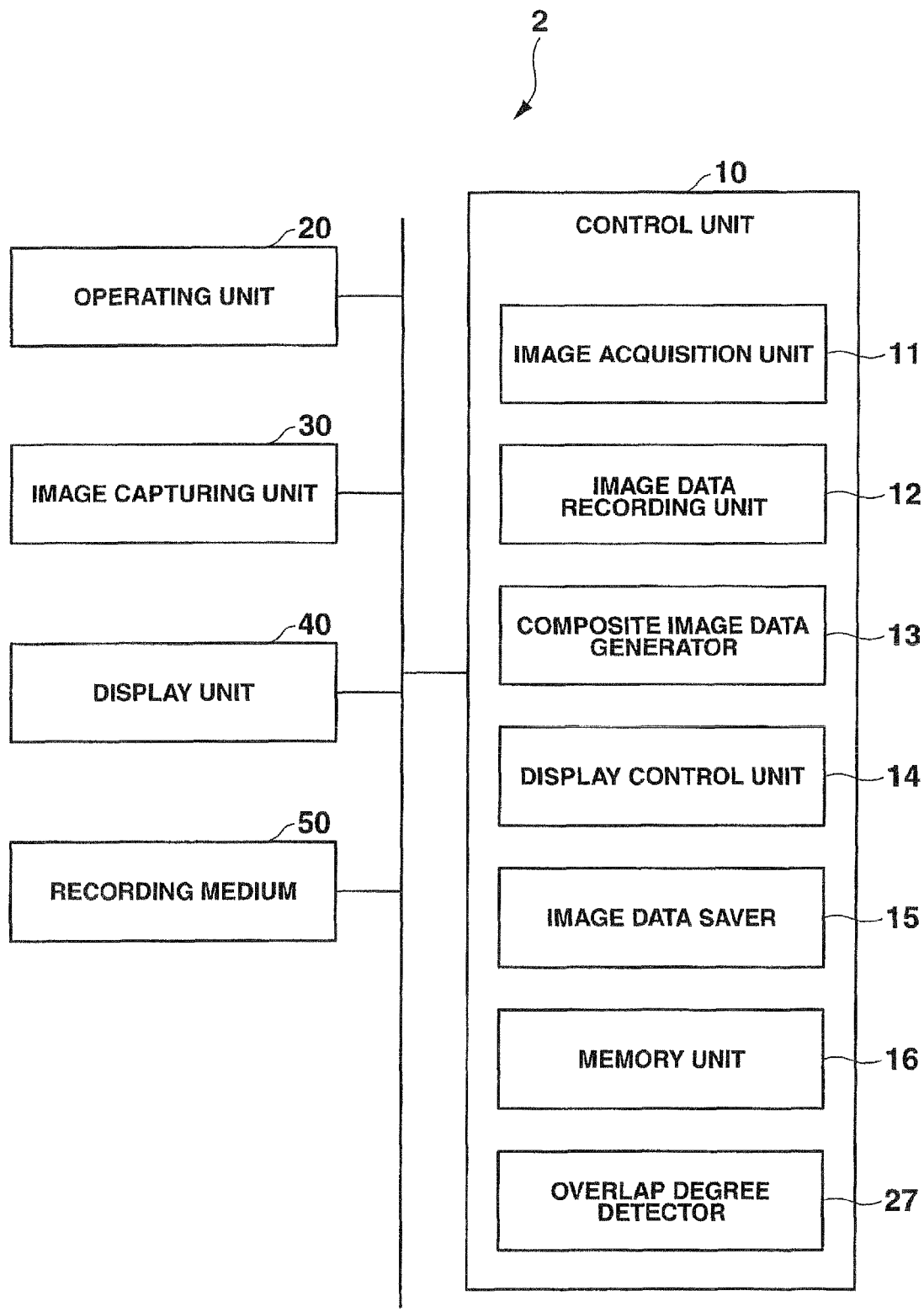
FIG. 7 is a block diagram illustrating an exemplary structure for the display control apparatus according to embodiment 2.

As shown in FIG. 7, in addition to each component of display control apparatus 1, display control apparatus 2 also comprises an overlap degree detector 27.

Other components are the same as for display control apparatus 1.

In FIG. 7, components which are the same as or equivalent to corresponding components of the display control apparatus 1 shown in FIG. 1 are given the same symbols; repeat explanations are abbreviated.

Figure 9A:
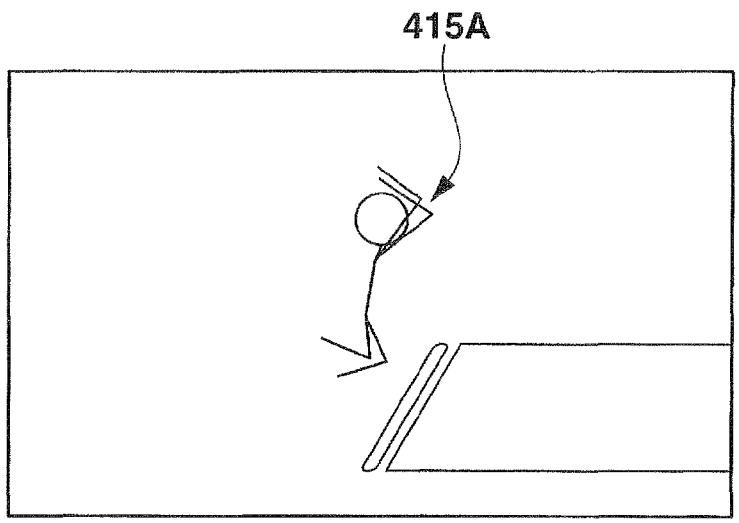
FIG. 9A is a diagram illustrating an example of an image represented by the earliest buffered image data buffered in the memory unit of the display control apparatus according to embodiment 2.
Figure 9B:
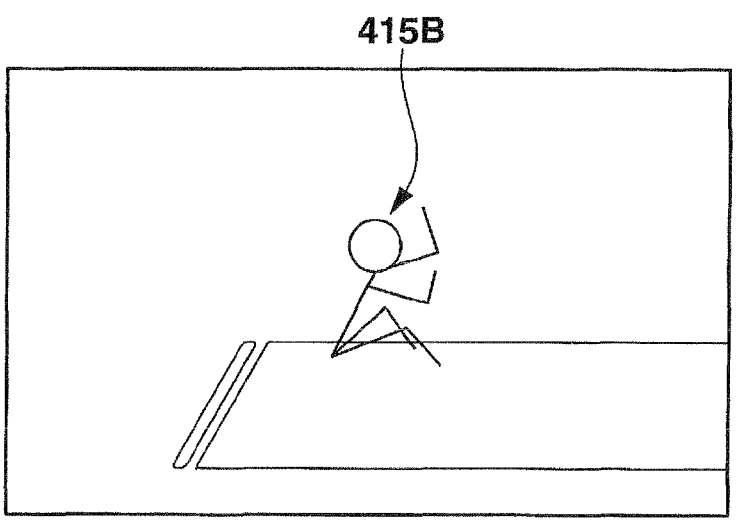
FIG. 9B is a diagram illustrating an example of a buffered image data positioned between earliest buffered image data and the latest buffered image data buffered in the memory unit of the display control apparatus according to embodiment 2.
Figure 9C:
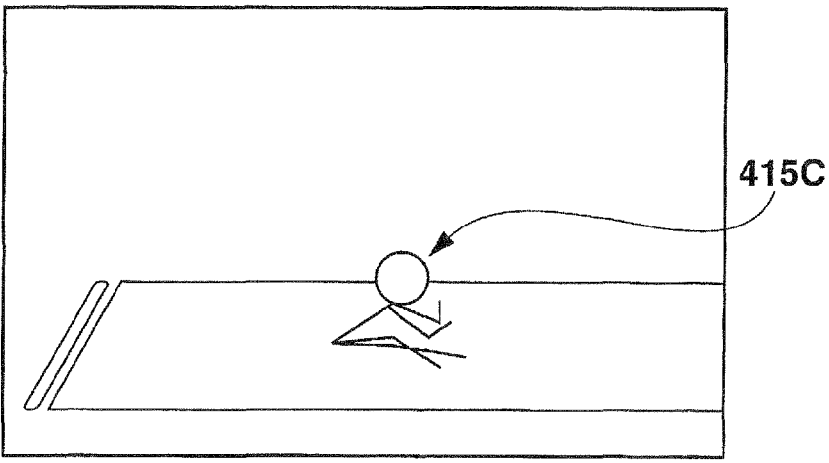
FIG. 9C is a diagram illustrating an example of the latest buffered image data buffered in the memory unit of the display control apparatus according to embodiment 2.

There are cases where even taking the operator to have captured the subject whilst moving the view angle, the subject continues to be positioned in the central region of the image (see FIG. 9A-FIG. 9C).

In such cases, when composited, nearly all the subject image regions are superimposed, which can make it difficult to identify changes in the subject (see in particular 415A, 415B drawn in dotted lines in FIG. 10).

Hence, display control apparatus 2 of embodiment 2 further comprises an overlap degree detector 27.

The hardware structure of the display control apparatus 2 is the same as those in FIG. 2; the description is therefore abbreviated.

The overlap degree detector 27 is comprised by the CPU 101.

The second display control process performed by the display control apparatus 2 (in particular the control unit 10) of embodiment 2 will be described.

Figure 8:
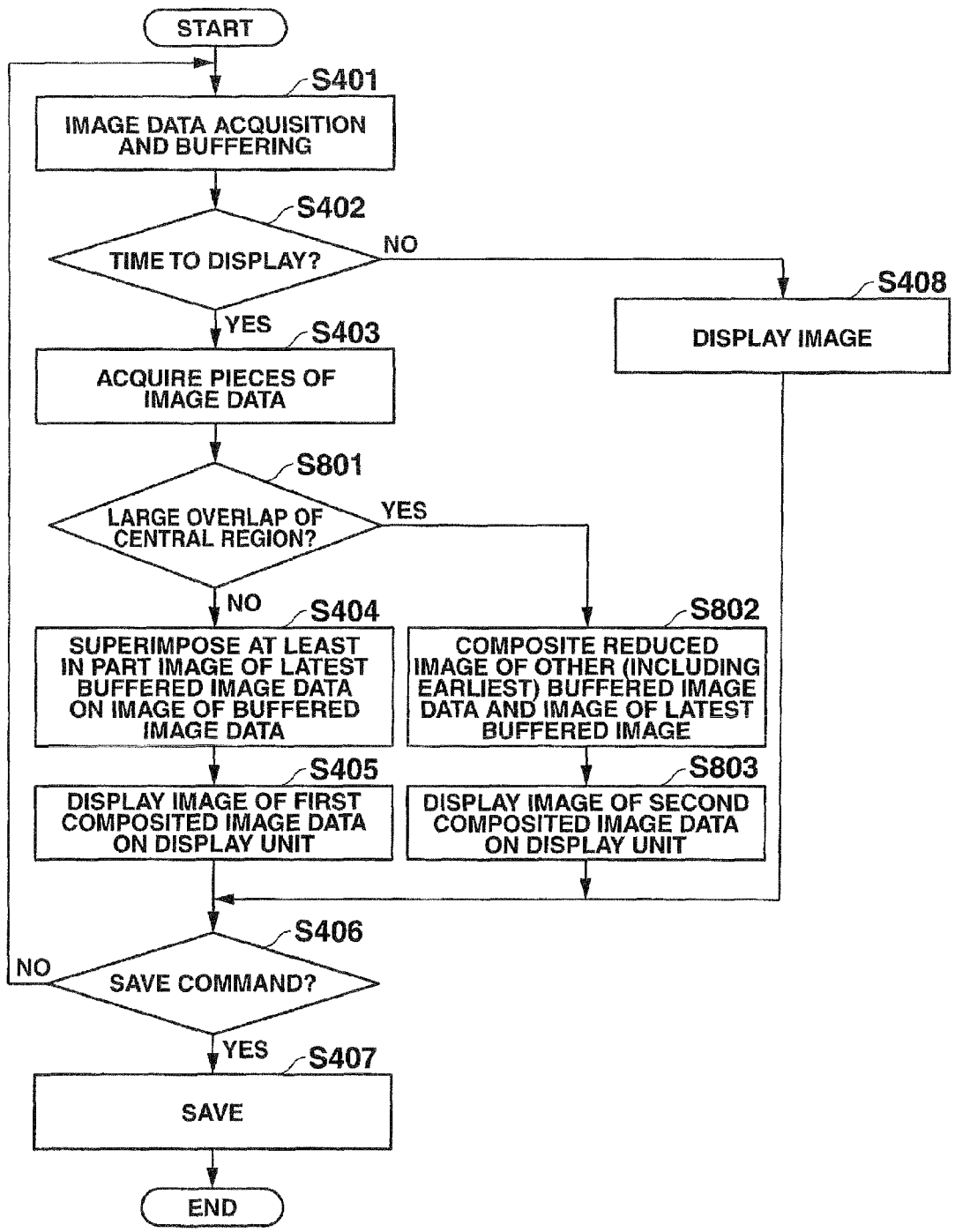
FIG. 8 is a flow chart showing an example of the second display control process performed by the display control apparatus according to embodiment 2.

Description of process steps in the second display control process which are the same as those of the first display control process is abbreviated. In FIG. 8, process steps which are the same as corresponding steps in the first display control process are given the same symbols as in FIG. 4.

In step S403, when the image data acquisition unit 11 acquires the latest buffered image data, the earliest buffered image data and other piece of/pieces of buffered image data from the memory unit 16, the overlap degree detector 27 determines whether the degree of overlap of the images represented in central regions of these pieces of image data is large or small (step S801).

The central region may be defined, for example, as the area within 15% of the image width to the left and right center of the image in the horizontal (long side) direction.

Specifically, the overlap degree detector 27 determines the change with time of the brightness value (pixel-wise change with time of the brightness or pixel-wise average change with time of the brightness) of the central region.

The overlap degree detector 27 determines whether the change with time exceeds a predetermined overlap degree threshold (that is, whether or not a fixed condition is achieved).

Where the change with time does not exceed the overlap degree threshold (that is, where the fixed condition is not achieved), the overlap degree detector 27 determines the overlap to be large.

Such determination may use methods such as SAD or SSD.

The overlap degree detector 27 may determine, from whether the view angle has moved, whether overlap degree of the central region of the pieces of image data is large.

That is, if the view angle moves, the operator may be attempting to image by tracking a moving subject with the view angle, increasing, as a result, the probability that subject images in consecutively captured pieces of image data overlaps.

Where instead the overlap degree detector 27 determines the overlap degree to be small (step S801: No), the composite image data generator 13 performs the same process as that described for embodiment 1 (step S404).

Where the overlap degree detector 27 determines the overlap degree to be large (step S801: Yes), there is a high probability that the subject in images represented by the pieces of image data is continued to be positioned within the central region.

Hence, the composite image data generator 13 generates a second composite image data as described below (step S802).

In step S802, the composite image data generator 13 reduces the image size of the earliest buffered image data.

Figure 11:
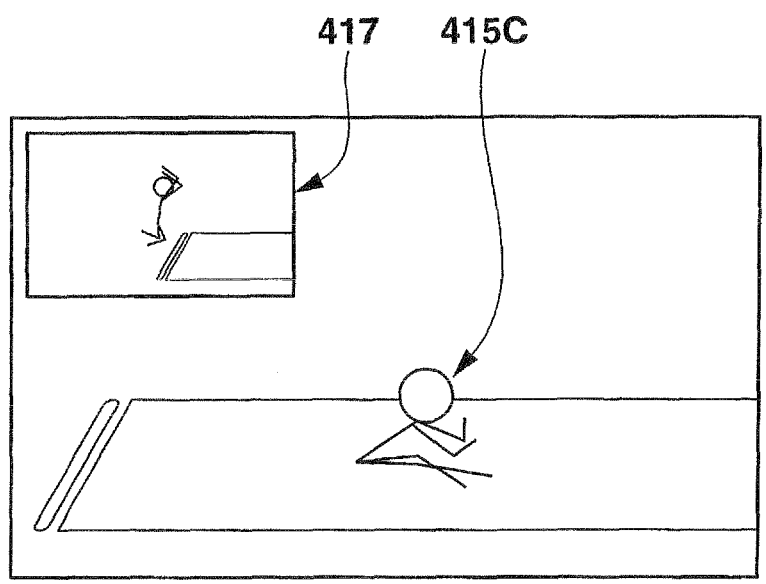
FIG. 11 is a diagram illustrating an example of an image represented by a second composite image data generated by the composite image data generator of the display control apparatus according to embodiment 2.

Thereafter, the composite image data generator 13 composites the reduced image represented by the earliest buffered image data and the predetermined position of the image represented by the latest buffered image data to generate second composite image data (see FIG. 11).

The second composite image data may be a composition of the latest buffered image data and multiple pieces of buffered image data.

The composite image data generator 13 reduces the image size of the earliest buffered image data and other piece of/pieces of buffered image data from the multiple pieces of buffered image data acquired by the image data acquisition unit 11.

Thereafter, the composite image data generator 13 generates a second composite image data compositing the reduced images represented by pieces of image data and the image represented by the latest buffered image data Such second composite image data are thus composition of image data represents the subject image 415C and pieces of image data represent reduced image 417.

The determination of whether the overlap degree is large or small may employ sensory information received at the time of the determination from a sensor or sensors (for example, acceleration sensors) contained in the display control apparatus 2.

That is, the overlap degree detector 27 (the CPU 101 and the sensor) obtains from the sensor an acceleration value which indicates the extent to which the velocity has changed per unit time, and determines whether the velocity is greater than/equal to (or greater than) a predetermined velocity threshold (in which case the overlap degree is large).

When the composite image data generator 13 generates a second composite image data, the display control unit 14 displays the image of the second composite image data on the display unit 40.

Hence the displayed image of the second composite image data avoids difficulties in resolving the subject image due to overlap.

Embodiment 3

The display control apparatus 3 of embodiment 3 employs the same hardware as the display control apparatus 2. Hence, for embodiment 3, the detailed description is abbreviated, with the display control apparatus 3 substituted for the display control apparatus 2.

Figure 12:
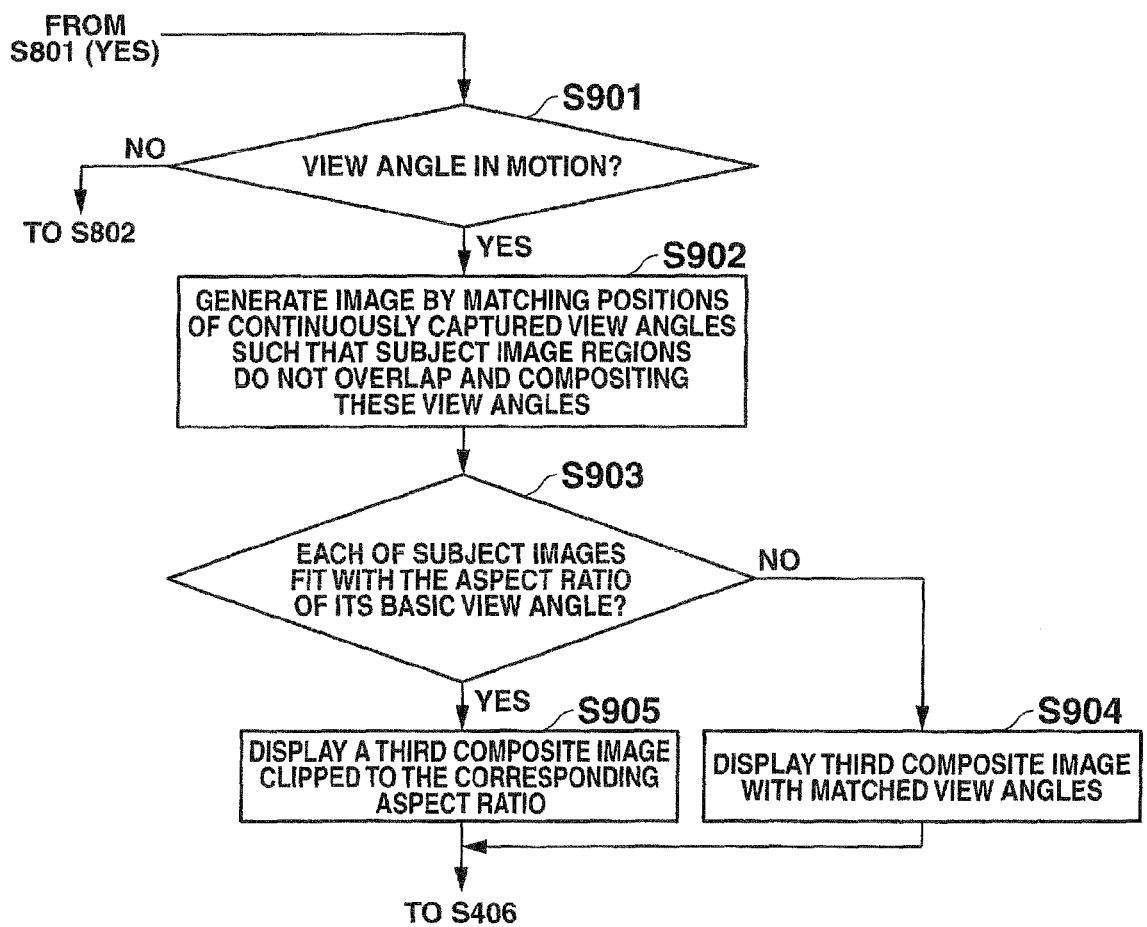
FIG. 12 is a flow chart showing an example of the third display control process performed by the display control apparatus according to embodiment 3.

The display control process 3 performed by the display, control apparatus 2 (in particular, the control unit 10) of embodiment 3 is described with reference to FIGS. 12 and 13.

In the step S801, where the overlap degree of the central region of the pieces of image data acquired by the image data acquisition unit 11 is determined to be large, the composite image data generator 13 determines whether the view angle is in motion during consecutive capturing (step S901).

Furthermore, if the view angle is not in motion, the display control apparatus 2 switches to step S802 of the embodiment 2.

Where the view angle is in motion, the composite image data generator 13 composites the view angles for pieces of image data buffered by the consecutively capturing such that the subject image regions do not overlap and the positions of background regions which do not include the subject image match (step S902).

Figure 13:
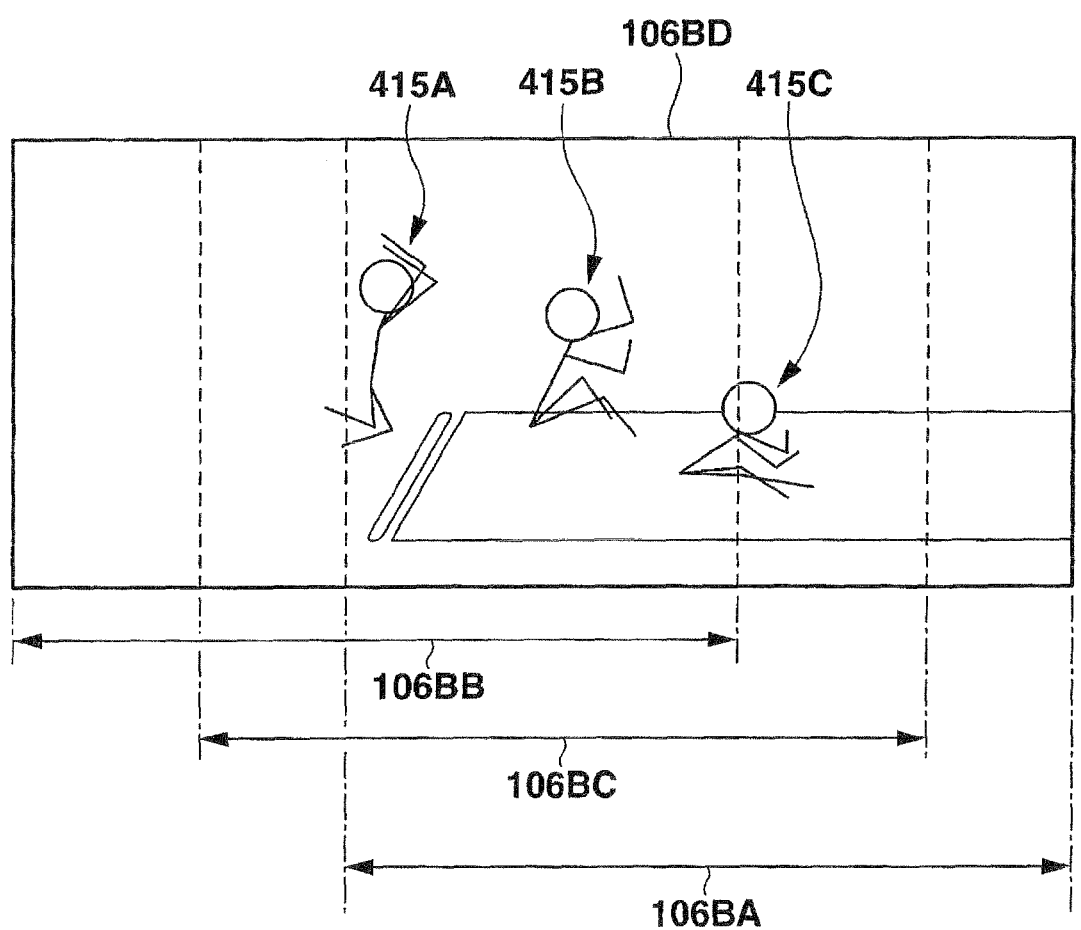
FIG. 13 is a diagram illustrating an example of an image represented by a third composite image data generated by the composite image data generator of the display control apparatus according to embodiment 3.

Specifically, when an athlete performing a running long jump is consecutively captured, the view angles for the image 106BB of the earliest buffered image data (buffered in memory region 106BB), the image 106BC of other piece of buffered image data (buffered in memory region 106BC) and the image 106BA of the latest buffered image data (buffered in memory region 106BA) may be composited as shown in FIG. 13 and widened as the view angle for the image 106BD.

Thereafter, based on the acquisition timing of each viewing angle, the subjects images 415A-415C represented by the pieces of buffered image data are composited.

In addition, in step S902, it is determined whether each of the subject images in the composited state is fit with the aspect ratio of its basic view angle (step S903).

Where subject images are determined to be not fit with the aspect ratio of its basic view angle (step S903: No), a third composite image data with a widened aspect ratio is generated and displayed on the display unit 40 (step S904), then switching to step S406.

Where instead the subject images are determined to fit with the aspect ratio of its basic view angle (step S903: Yes), a third composite image data clipped at the corresponding the aspect ratio is generated and displayed on the display unit 40 (step S905), then switching to step S406.

In FIG. 13, the subject images fit with the view angle of the image data 106BC; hence, other viewing angles are deleted.

Determination of whether the view angle has shifted may employ sensory information received at the time of the determination from a sensor or sensors (for example acceleration sensors) contained in the display control apparatus 3.

That is, the composite image data generator 13 obtains from the sensors (for example, acceleration sensors) an acceleration value which indicating the extent to which the velocity has changed per unit time, and determines whether the velocity is greater than/equal to (or greater than) a predetermined velocity threshold to determine the view angle and whether the view angle is large or small.

Hence the displayed composite image of third composite image data can show the subject images without overlapping, even with changes in the range of the captured image due to movement of the subject under tracking and consecutive capturing.

In embodiments 1-3, the display control apparatus has been described with reference to image capturing apparatus such as digital cameras; however, the display control apparatus may be applied to portable devices such as mobile telephones equipped with camera functions.

Furthermore, the display control apparatus of the present application may use different components to suit each application.

For example, the display control apparatus may be made independent of a digital camera, and used as a device to save a movie of a specified length based on successive pieces of image data sent from the digital camera.

Otherwise, the display control apparatus of the present application may be used as a recording system for movies via transmission networks such Internet-type information networks and digital television broadcasts-type broadcast networks.

For example, the display control apparatus of the present application used as a computer-type communications terminal to save a movie of a specified length based on successive pieces of image data sent from a server.

The display control apparatus of the present application may alternatively be used as a server-type communications terminal to recorded movie of a specified length to a computer-type communications terminal.

In addition, the display control programs 105 executed by the CPU 101 in the display control apparatus 1, 2, and 3 were explained as prerecorded in the ROM 103, but this may be acquired from an external storage medium, a recording non-transitory medium or may be one stored after being transmitted over a network.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A display control apparatus comprising:
   an input unit that inputs a piece of image data;
   an acquisition control unit that controls the input unit to consecutively acquire a plurality of pieces of image data;
   a memory control unit that successively stores in a memory unit the plurality of pieces of image data consecutively acquired by the acquisition control unit;
   a first image compositor that composites a latest stored image data from among the plurality of pieces of image data stored by the memory control unit, and at least one other of the plurality of pieces of image data;
   a display control unit that causes a display unit to display an image based on a composited image data composited by the first image compositor;
   a position acquisition unit that acquires positions of subject image regions in images represented by the plurality of pieces of image data;
   a comparison unit that compares the positions of the subject image regions acquired by the position acquisition unit; and
   a motion detector that determines, based on a result of the comparison by the comparison unit, whether a movement amount of the positions of the subject image regions is greater than/equal to a predetermined amount;
   wherein the first image compositor composites a plurality of pieces of image data for which the motion detector determines the movement amount of the positions of the subject image regions to be greater than/equal to the predetermined amount; and
   wherein the display control apparatus further comprises:
      an overlap determination unit that compares the plurality of pieces of image data and determines whether an extent of a degree of overlap of the subject image regions is at least a predetermined amount;
      a reduced image data generator that generates a piece of/pieces of reduced image data by reducing a display size of a piece of/pieces of image data other than the latest stored image data when the extent of the degree of overlap of the subject image regions is determined to be greater than/equal to the predetermined amount by the overlap determination unit; and
      a second image compositor that composites the piece of/pieces of reduced image data generated by the reduced image data generator and the latest stored image data;
      wherein the display control unit causes the display unit to display an image represented by an image data composited by the second image compositor instead of an image represented by the image data composited by the first image compositor when the extent of the degree of overlap of the subject image regions is determined to be greater than/equal to the predetermined amount by the overlap determination unit.

2. The display control apparatus according to claim 1, further comprising:
   a clipper that clips, from at least one of the images represented by the plurality of pieces of image data, an image region/image regions corresponding to the position of the subject image region/the positions of the subject image regions acquired by the position acquisition unit,
   wherein the first image compositor composites the image region/image regions clipped by the clipper and an image represented by other image data.

3. The display control apparatus according to claim 1, wherein the first image compositor composites the latest stored image data and the at least one other of the plurality of image data consecutively acquired by the acquisition control unit such that a relative transparency of each image represented by the at least one other of the plurality of image data is related to a relative time at which the image data was acquired.

4. The display control apparatus according to claim 1, wherein the display control unit controls the display unit to chronologically display a proceeding of a composition by the image compositor based on a relative time at which the plurality of pieces of image data were acquired by the acquisition control unit.

5. The display control apparatus according to claim 1, further comprising:
   a viewing angle shift determination unit that determines whether a viewing angle has shifted during the acquisition of the plurality of pieces of image data by the acquisition control unit,
   wherein the first image data compositor determines, based on the determination of the viewing angle shift determination unit, whether to composite the plurality of pieces of image data.

6. A display control method comprising:
   controlling an image data input unit to consecutively acquire a plurality of pieces of image data;
   successively storing in a memory unit the plurality of pieces of image data consecutively acquired by the step of image data acquisition control;
   performing a first compositing of a latest stored image data from among the plurality of pieces of image data stored by the memory control unit, and at least one other of the plurality of pieces of image data;
   causing a display unit to display an image based on a composited image data composited in performing the first compositing;
   acquiring positions of subject image regions in images represented by the plurality of pieces of image data;
   comparing the acquired positions of the subject image regions; and
   determining, based on a result of the comparing, whether a movement amount of the positions of the subject image regions is greater than/equal to a predetermined amount;
   wherein the first compositing composites a plurality of pieces of image data for which the determining determines the movement amount of the positions of the subject image regions to be greater than/equal to the predetermined amount; and
   wherein the method further comprises:
      comparing the plurality of pieces of image data and determining whether an extent of a degree of overlap of the subject image regions is at least a predetermined amount;
      generating a piece of/pieces of reduced image data by reducing a display size of a piece of/pieces of image data other than the latest stored image data when the extent of the degree of overlap of the subject image regions is determined to be greater than/equal to the predetermined amount;
      performing a second compositing of the piece of/pieces of reduced image data and the latest stored image data; and
      causing the display unit to display an image based on a composited image data composited in performing the second image compositing instead of an image based on the composited image data composited in performing the first compositing when the extent of the degree of overlap of the subject image regions is determined to be greater than/equal to the predetermined amount by the comparing.

7. A non-transitory computer-readable storage medium which stores a computer-readable program thereon, the program controlling a computer to function as units comprising:
   an input unit that inputs a piece of image data an acquisition control unit that controls the input unit to consecutively acquire pieces of image data;
   a memory control unit that successively stores in a memory unit the plurality of pieces of image data consecutively acquired by the acquisition control unit;
   a first image compositor that composites a latest stored image data from among the plurality of pieces of image data stored by the memory control unit, and at least one other of the plurality of pieces of image data;
   a display control unit that causes a display unit to display an image based on a composited image data composited by the first image compositor;
   a position acquisition unit that acquires positions of subject image regions in images represented by the plurality of pieces of image data;
   a comparison unit that compares the positions of the subject image regions acquired by the position acquisition unit; and
   a motion detector that determines, based on a result of the comparison by the comparison unit, whether a movement amount of the positions of the subject image regions is greater than/equal to a predetermined amount;
   wherein the first image compositor composites a plurality of pieces of image data for which the motion detector determines the movement amount of the positions of the subject image regions to be greater than/equal to the predetermined amount; and
wherein the program controls the computer to function as further units comprising:
   an overlap determination unit that compares the plurality of pieces of image data and determines whether an extent of a degree of overlap of the subject image regions is at least a predetermined amount;
   a reduced image data generator that generates a piece of/pieces of reduced image data by reducing a display size of a piece of/pieces of image data other than the latest stored image data, when the extent of the degree of overlap of the subject image regions is determined to be greater than/equal to the predetermined amount by the overlap determination unit; and
   a second image compositor that composites the piece of/pieces of reduced image data generated by the reduced image data generator and the latest stored image data;
   wherein the display control unit causes the display unit to display an image represented by an image data composited by the second image compositor instead of an image represented by the image data composited by the first image compositor when the extent of the degree of overlap of the subject image regions is determined to be greater than/equal to the predetermined amount by the overlap determination unit.

* * * * *